United States Patent
Sekiguchi et al.

(10) Patent No.: US 6,719,501 B2
(45) Date of Patent: Apr. 13, 2004

(54) CEMENTED CARBIDE END MILL (75) Inventors: Toru Sekiguchi, Toyama (JP); Yuu Kagiya, Itami (JP); Yasushi Goshima, Toyama (JP)

(73) Assignees: Nachi-Fujikoshi Corp., Toyama (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/976,272

(22) Filed: Oct. 15, 2001

(65) Prior Publication Data

US 2002/0067964 A1 Jun. 6, 2002

(30) Foreign Application Priority Data

Oct. 27, 2000 (JP) .......................... 2000-327985

(51) Int. Cl.[7] .............................. B23B 27/14; B23C 5/20
(52) U.S. Cl. .......................................... 407/63; 407/119
(58) Field of Search .............................. 407/53, 54, 63, 407/119; 408/144

(56) References Cited

U.S. PATENT DOCUMENTS

| | | | | |
|---|---|---|---|---|
| 4,285,618 A | * | 8/1981 | Shanley, Jr. ................. | 407/54 |
| 4,728,231 A | * | 3/1988 | Kunimori et al. ............. | 408/59 |
| 4,810,136 A | * | 3/1989 | Paige ........................... | 407/54 |
| 5,176,476 A | * | 1/1993 | Duffy et al. .................. | 407/63 |
| 5,810,517 A | * | 9/1998 | Bostic .......................... | 407/53 |
| 5,955,186 A | * | 9/1999 | Grab ......................... | 428/312.8 |
| 6,056,485 A | * | 5/2000 | Magill et al. ................. | 407/54 |
| 6,082,935 A | * | 7/2000 | Hori ............................. | 407/54 |
| 6,368,030 B1 | * | 4/2002 | Sato et al. .................... | 407/53 |
| 2002/0031409 A1 | * | 3/2002 | Sato et al. .................... | 407/53 |

FOREIGN PATENT DOCUMENTS

JP        A-2000-52127        2/2000

\* cited by examiner

*Primary Examiner*—Daniel W. Howell
*Assistant Examiner*—Brian D. Walsh
(74) *Attorney, Agent, or Firm*—Venable LLP; Catherine M. Voorhees (57) ABSTRACT

A cemented carbide end mill has three or more cutting edges formed on its periphery and flutes each provided between adjacent cutting edges. The land width of each cutting edge and the flute width has a ratio of 1:1.5 to 1:4. Each flute has a helix angle of 35°–60° and, when viewed in a cross section perpendicular to the end mill axis, is in a shape smoothly concave radially inwardly. The core of the end mill has a diameter which is 62%–68% of the outer diameter of the end mill. The cutting edges have a base material of ultra-fine cemented carbide and are coated with a titanium-aluminum nitride hard film. The end mill is good at chip discharging in groove cutting and provides less inclination of cut grooves and less corner wear of the end mill.

3 Claims, 7 Drawing Sheets

3-FLUTE END MILL OF INVENTION

FIG. 5

CONVENTIONAL 2-FLUTE END MILL

FIG. 6

CONVENTIONAL 3-FLUTE END MILL

FIG. 7

CONVENTIONAL 4-FLUTE END MILL

⊙ : CUT GROVE NOT INCLINED
○ : INCLINATION WITHIN ALLOWABLE RANGE
△ : INCLINATION OUTSIDE ALLOWABLE RANGE

CEMENTED CARBIDE END MILL

BACKGROUND OF THE INVENTION

The present invention relates to a cemented carbide end mill with three or more cutting edges that can perform drilling, grooving and side-surface cutting with high efficiency in milling operations.

Figure 3A:
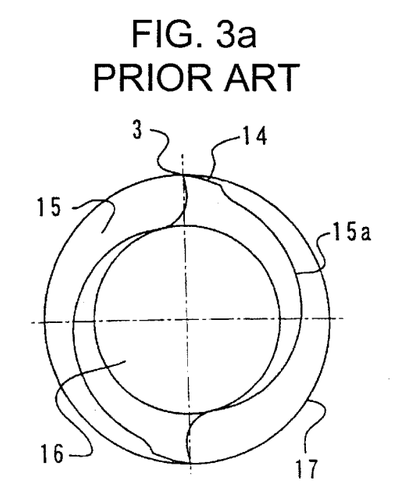
FIG. 3a is an enlarged cross-sectional view of a two-flute end mill perpendicular to the axis, FIG. 3b an enlarged cross-sectional view of a three-flute end mill perpendicular to the axis, and FIG. 3c an enlarged cross-sectional view of a four-flute end mill perpendicular to the axis.
Figure 3B:
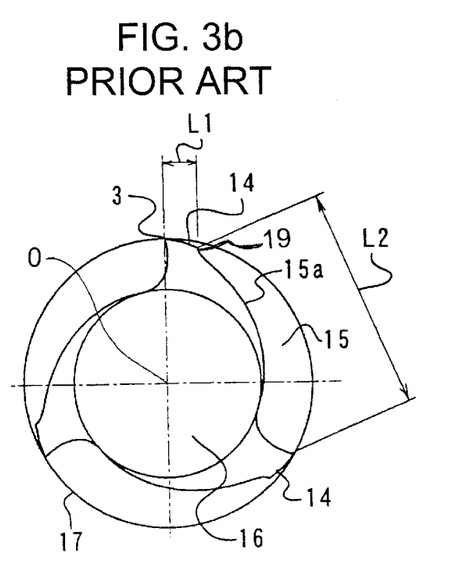
Figure 3C:
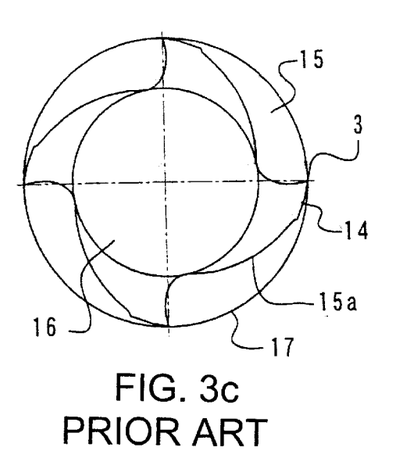

The cemented carbide end mill comprises peripheral cutting edges and end cutting edges. A conventional three-flute cemented carbide end mill, when viewed in across section perpendicular to an axis of the end mill as shown in FIG. 3b, has a ratio of about 1 to 6 between a land width L1 of a flank 14 of a peripheral cutting edge 3 and a width L2 of a flute 15. According to the definition given by The Japanese Industrial Standard (JIS), "land width" is defined as "the width of land" and "land" is defined as "The part having bank state width from cutting edge to heel of milling cutter having slots (flutes). Further, "flute" is defined as "The dent part between the neighboring cutting edge and the heel. Therefore, "the land width L1" is the width from a cutting edge 3 to heel 19, and this width is measured as shown in the FIG. 3b, the radial width between a line passing both a cutting edge 3 and an axis 0 of the end mill, and a parallel line thereto passing through heel 19. And "the flute width L2" is drawn as the distance between the neighboring cutting edge 3 and heel 19 from the definition of the "flute". A core diameter d1 is about 60%–70% of an outer diameter 17. The flute 15 has a 60%–70% slant portion 15a in a shape bulging radially outwardly. FIGS. 3a and 3c illustrates a conventional two-flute end mill and four-flute end mill, respectively.

JP-2000-52127A discloses an end mill of a different shape. This end mill, when viewed in a cross section perpendicular to the peripheral cutting edges, has its flute surfaces assuming a continuous concave shape, its core diameter of about 60%–75% of the outer diameter and its helix angle of about 30°–50°.

In conventional cemented carbide end mills, a two-flute end mill is mainly used for hole drilling and groove cutting. In side surface machining, three- and four-flute end mills are more advantageous than the two-flute end mills in terms of machining efficiency and precision. In hole drilling and groove cutting, on the other hand, the three- and four-flute end mills are not good at chip discharging capability, and have a problem that cut grooves are inclined or their corners are severely worn out.

BRIEF SUMMARY OF THE INVENTION

An object of the present invention is to solve the above-described problem of the conventional art and provide a cemented carbide end mill with three or more cutting edges, which has a good chip discharging capability even in the hole drilling and groove cutting and which minimizes the tilting of cut grooves and the corner wear of the end mill.

The invention solves the above-described problem by the cemented carbide-coated end mill constructed as follows. The cemented carbide end mill has three or more cutting edges formed on its periphery and a plurality of flutes each provided between adjacent cutting edges. Each of the cutting edges has a base material of ultra-fine cemented carbide allow containing 10%–14% cobalt and is coated with a titanium-aluminum nitride hard film. Each flute has a helix angle of 35°–60° and, when viewed in a cross section perpendicular to the end mill axis, is in a shape generally concave radially inwardly. The cutting edges and the flutes are so formed that the ratio of the land width to the flute width is 1:1.5 to 1:4, and that the core diameter is 62%–68% of the diameter of the end mill, wherein the land width is the width from the cutting edge to heel, and the flute width is the distance between the neighboring cutting edge and heel.

With this construction, the cutting edges are greatly improved in tenacity because of the base material of ultra-fine cemented carbide alloy containing 10%–14% cobalt, and are improved in wear resistance because of the titanium-aluminum nitride hard film coated thereon. In addition, the ratio of the land width to the flute width, when viewed in a cross section perpendicular to the axis of the cutting edges, is set at 1:1.5 to 1:4 so as to increase the land width. This increases the rigidity of the end mill and thus can reduce the inclination of cut grooves and the corner wear of the end mill. The flutes, because of the generally concave bottom shape, facilitate the curling of chips and forcibly discharge them. Further, setting the flute helix angle at 35°–60° intends to both reduce the cutting resistance and increase the end mill strength against fracture.

Between the heel and a flute bottom, the flute may comprise two generally concave portions and be in a shape in which these two portions are intersected such that the intersecting point protrudes radially outwardly.

Each of the cutting edges preferably has a first flank following the cutting edge and a second flank connecting the first flank and the flute, and the second flank is in a shape generally concave radially inwardly. With this structure, a stepped portion in a conventional end mill that follows the flank of a cutting edge is replaced with the smooth curved surface to enable further enhancement of the rigidity of the end mill.

In the case of a three-flute end mill, it is preferable that the land width-to-flute width ratio is 1:2 to 1:4 and the flute helix angle is 40°–60°.

In the case of a four-flute end mill, it is preferable that the land width-to-flute width ratio is 1:1.5 to 1:3 and the flute helix angle is 35°–45°.

BRIEF DESCRIPTION OF THE SEVERAL VIEWS OF THE DRAWINGS

The above-described and other features and advantages will become more apparent from the description which will be made below in conjunction with the accompanying drawings, in which:

FIG. 3 illustrates cutting edge portions of conventional cemented carbide end mills, wherein

FIG. 5 shows the result of measurement in a hole cutting test using the end mill of FIG. 3a;

DETAILED DESCRIPTION OF THE INVENTION

The present invention will be described in detail with reference to the embodiments shown in the accompanying drawings. Parts, which may be identical with those of the conventional end mill, are given the same reference numbers as in FIGS. 3a–c.

Figure 1:
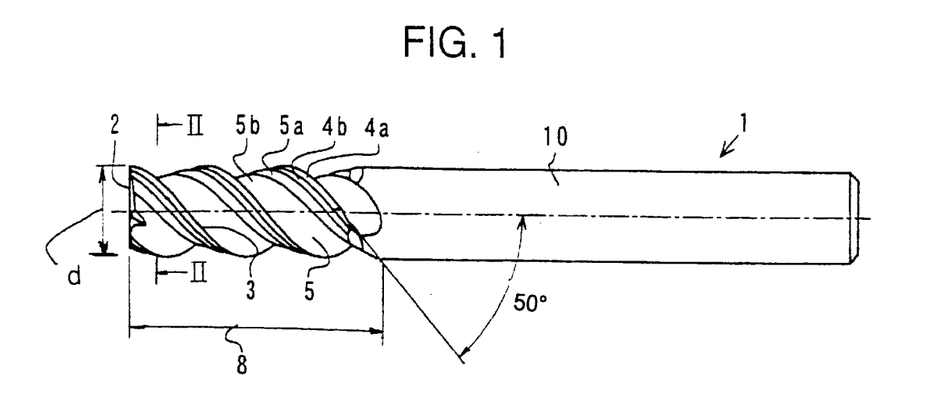
FIG. 1 is a side view of a three-flute cemented carbide end mill according to the first embodiment of the invention, which is 10 mm in diameter.
Figure 2:
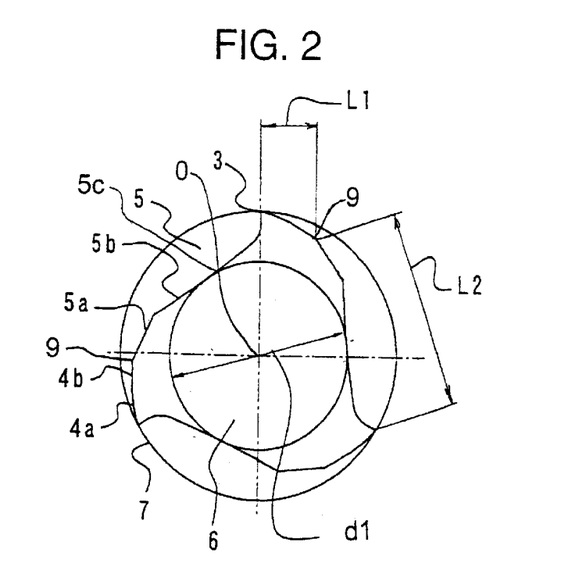
FIG. 2 is an enlarged cross-sectional view taken along the line II—II of FIG. 1, which is perpendicular to the axis.

FIG. 1 shows a three-flute cemented carbide end mill according to the first embodiment of the invention, which has a diameter d of 10 mm. FIG. 2 shows the end mill in an enlarged cross section taken along the line II—II of FIG. 1.

In FIGS. 1 and 2, the end mill 1 has three cutting edges 3 formed on an outer periphery of its solid cylindrical body portion and flutes 5 between these edges. Each of the cutting edges includes a first flank 4a following the cutting edge and a second flank 4b connecting the first flank and heel 9. The second flank 4b, when viewed in the cross section of FIG. 2, is slightly concave radially inwardly. The land width L1 of the cutting edge, is the width from the cutting edge 3 to a heel 9, is 2.6 mm, the flute width L2, which is the distance between the heel 9 and the neighboring cutting edge 3, is 7.8 mm, and thus, the ratio of the land width to the flute width is 1:3. The core diameter d1 is 6.5 mm, which is 65% of the outer diameter 7 of the end mill.

Between the heel 9 and a flute bottom 5c, each of the flutes 5 comprise first and second slant portions 5a,5b, which, as viewed in the cross section of FIG. 2, are generally concave radially inwardly and are connected each other with their intersecting point projecting radially outwardly. As shown in FIG. 1,the flutes 5 each have a helix angle of 50°. The cutting edges 3 have a base material of ultra-fine particle cemented carbide containing 86% WC, 12% Co, and 1% other materials, and are coated with a titanium-aluminum nitride (TiAlN) hard film on their surfaces 8. Reference number 2 in the figure denotes end cutting edges at the tip of the end mill, and 10 a shank.

A comparative cutting test was conducted in which holes were cut using the three-flute cemented carbide end mill constructed as above and two-, three- and four-flute cemented carbide end mills of the conventional shapes shown in FIG. 3 which are 10 mm in diameter. FIGS. 4 to 7 show the results of the comparative cutting test, in which measurements were made of changes in a cutting resistance as related to a hole depth or depth of cut in the hole cutting. In these figures, the left ordinate represents a thrust the right ordinate represents a torque, and the abscissa represents a depth of cut or hole depth in mm. FIG. 4, FIG. 5, FIG. 6 and FIG. 7 show the results of measurements for the three-flute cemented carbide end mill of the invention, the conventional two-flute end mill, the conventional three-flute end mill, and the conventional four-flute end mill, respectively. The test condition was as follows: a cutting speed V=80 m/min (revolution speed 2,550 $min^{-1}$), a feeding speed F=200 mm/min, a hole depth 10 mm, and a material machined of SKD 11 (220 HB). The cutting was performed in a dry condition while blowing air.

Figure 4:
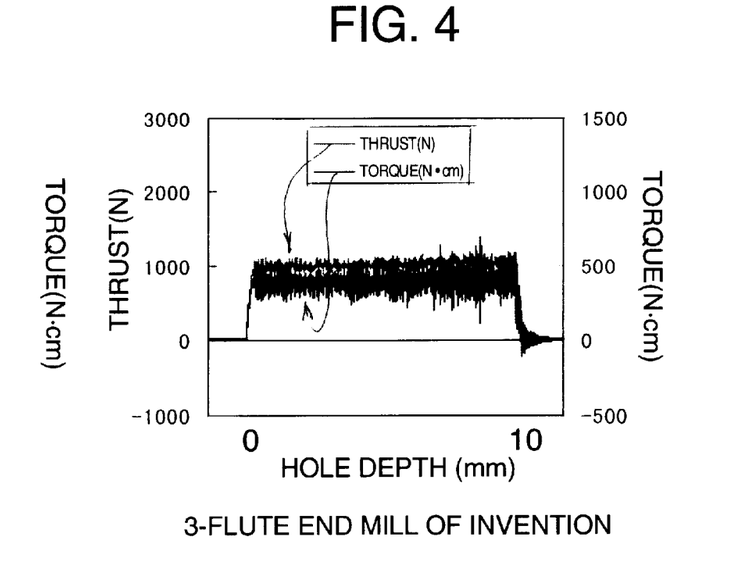
FIG. 4 shows the result of measurement in a hole cutting test using the end mill of FIG. 1.
Figure 5:
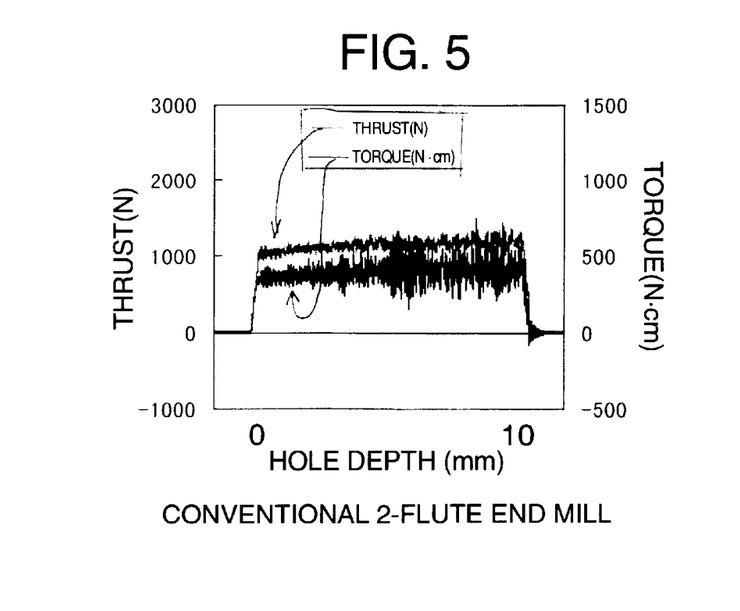
Figure 6:
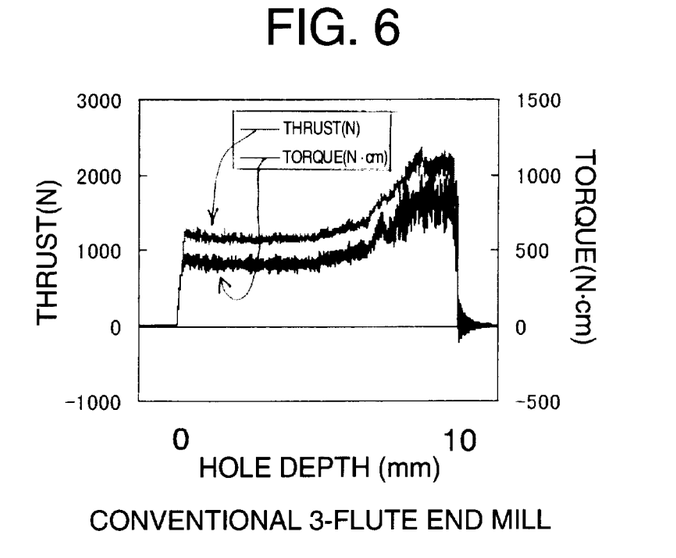
FIG. 6 shows the result of measurement in a hole cutting test using the end mill of FIG. 3b.
Figure 7:
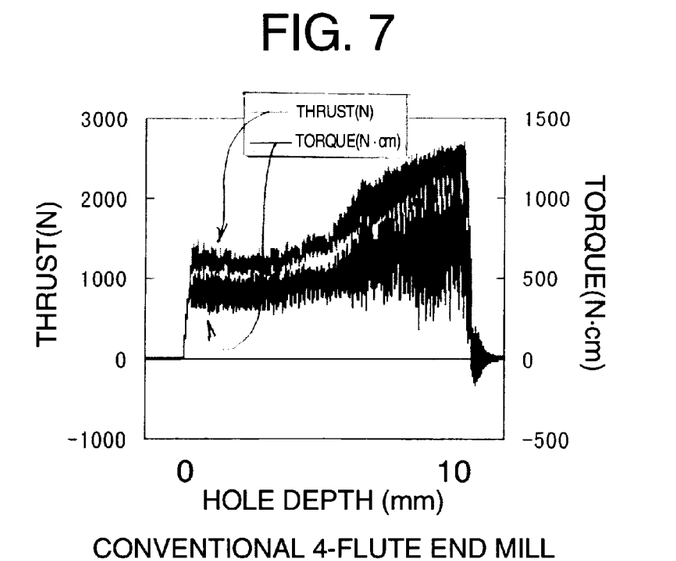
FIG. 7 shows the result of measurement in a hole cutting test using the end mill of FIG. 3c.

As shown in FIGS. 6 and 7, the conventional 3- and 4-flute cemented carbide end mills, according as the hole cutting is progressing, caused chip clogging or jamming, resulting in a sharp increase and large variations in the cutting resistance in the middle of the cutting. In contrast, the 3-flute end mill of the invention and the conventional 2-flute end mill, as shown in FIGS. 4 and 5, had no increase or variation in the cutting resistance and could perform stable cutting. The 3-flute end mill of the invention thus could have a performance equivalent to that of the 2-flute end mill.

Then, another test was conducted in which a hole was drilled as described above, immediately followed by the machining of a groove, to compare damages to the 3-flute end mill of the invention and the end mills of the conventional shapes. The test condition was as follows: a cutting speed V=80 m/min (revolution speed 2,550 $min^{-1}$), a feeding speed during hole cutting F=200 mm/min, and a feeding speed during groove cutting F=1000 mm/min. The material machined was SKD11 (220HB) and was milled in a dry condition while blowing air to form a hole of 10 mm deep first and then a groove of 10 mm deep and 200 mm long.

As the result, the conventional 2-, 3- and 4-flute cemented carbide end mills shown in FIG. 3 failed during the first transition from hole drilling to groove cutting and were unable to continue machining. In contrast, the end mill of the invention had no abnormal damage such as chipping and breakage, and was able to perform 100 continuous operations from drilling to groove cutting. In other words, the 3-flute end mill of the invention enables a high-speed feed in the continuous machining from hole drilling to groove cutting, which has been impossible with the conventional end mills. It will be appreciated from these results that the 3-flute end mill of the invention is as good as the conventional 2-flute end mill at hole drilling and is able to perform a continuous machining from hole drilling to groove cutting and also a high-speed feed milling, both not achievable with the conventional 2-flute end mill and so forth.

Figure 8:
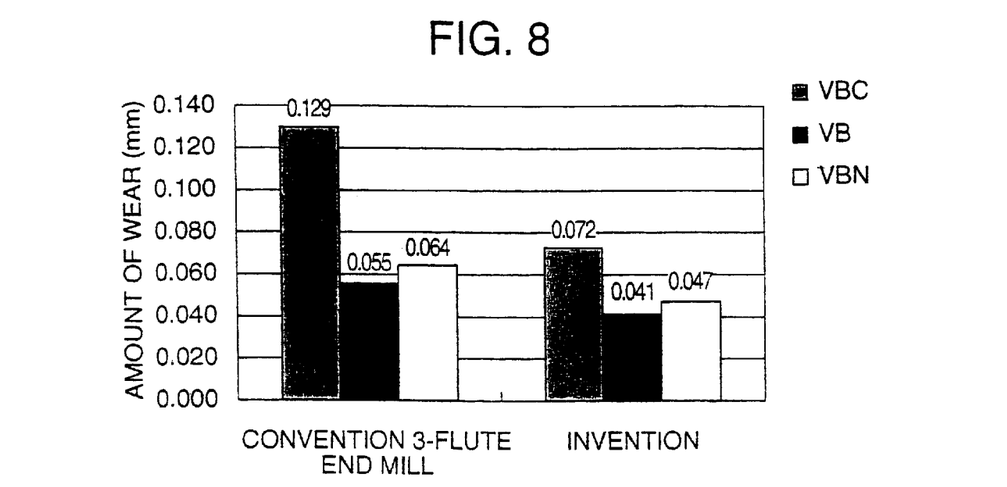
FIG. 8 shows a comparison in the amount of wear between the end mill of FIG. 1 and the end mill of FIG. 3b in an endurance test in which grooves were cut while using a work of SKD 61 (40HRC)

Further, a groove cutting endurance test was conducted to compare the 3-flute end mill of the invention with the conventional 3-flute end mill shown in FIG. 3. In this test, the material was changed to SKD61 (40HRC), and the amount of corner wear during groove cutting was measured. The test condition was as follows: a cutting speed V=50 m/min (revolution 1,600 $min^{-1}$), a table feeding speed 200 mm/min, axial depth of cut 5 mm, and a lateral depth of cut 10 mm (groove cutting). The milling was done in a dry condition while blowing air, and after the cutting was done for a length of 5 m, measurements were made of the amounts of corner wear VBC, flank wear VB and boundary wear VBN (all in mm). The result is shown in FIG. 8. As shown in FIG. 8, the end mill of the invention is less than the conventional end mill in any of the corner wear, flank wear and boundary wear. As for the corner wear in particular, the end mill of the invention measures 0.072 mm while that of the conventional end mill is 0.129 mm, and the end mill of the invention exhibits a 40% reduction as compared with the conventional end mill.

Next, a modification of the 3-flute end mill of the invention will be explained. The end mill of the modification is formed from the same material as that of the first embodiment and in the shape shown in FIGS. 1 and 2 except for the shape of flutes and parts dimensions. For simplification, showing of this modification in the drawings is omitted, and only the modified portions will be described.

The end mill of the modification is 10 mm in diameter and, when viewed in a cross section perpendicular to the axis, a land width L1 is 3.0 mm, a flute width L2 is 7.5 mm, and a land width-to-flute width ratio is 1:2.5. The core diameter is 6.2 mm, which is 62% of the outer diameter. The flutes, when viewed in a cross section perpendicular to the end mill axis, are each in a curved shape which is smoothly concave radially inwardly, and have a helix angle of 45°. For the cemented carbide end mill of this modification, a cutting test, a groove cutting endurance test, and a side-surface machining endurance test, which are similar to those for the first embodiment, were conducted, and almost similar test results to those of the end mill of the first embodiment were attained.

Figure 9:
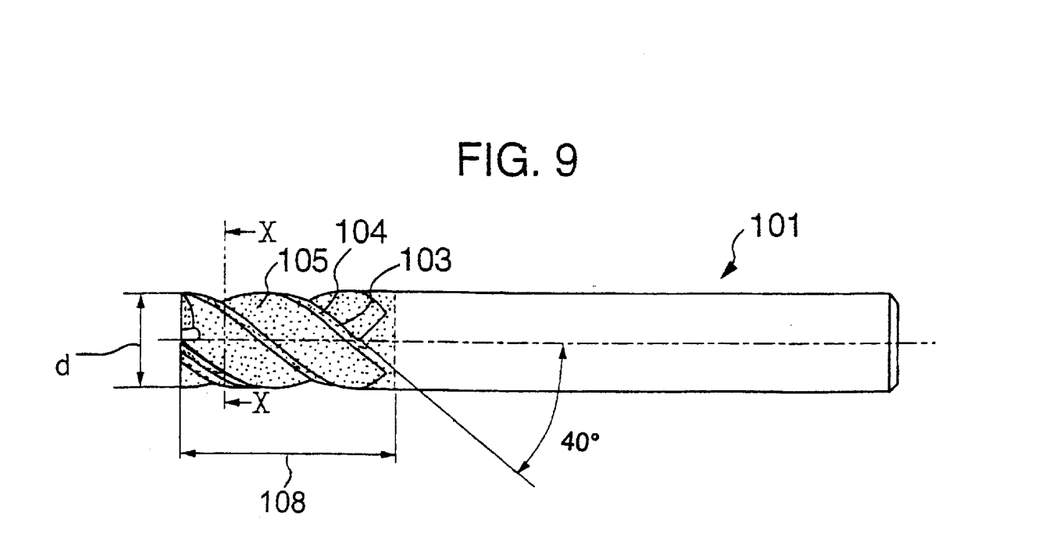
FIG. 9 shows a side view of a four-flute cemented carbide end mill according to the second embodiment of the invention.
Figure 10:
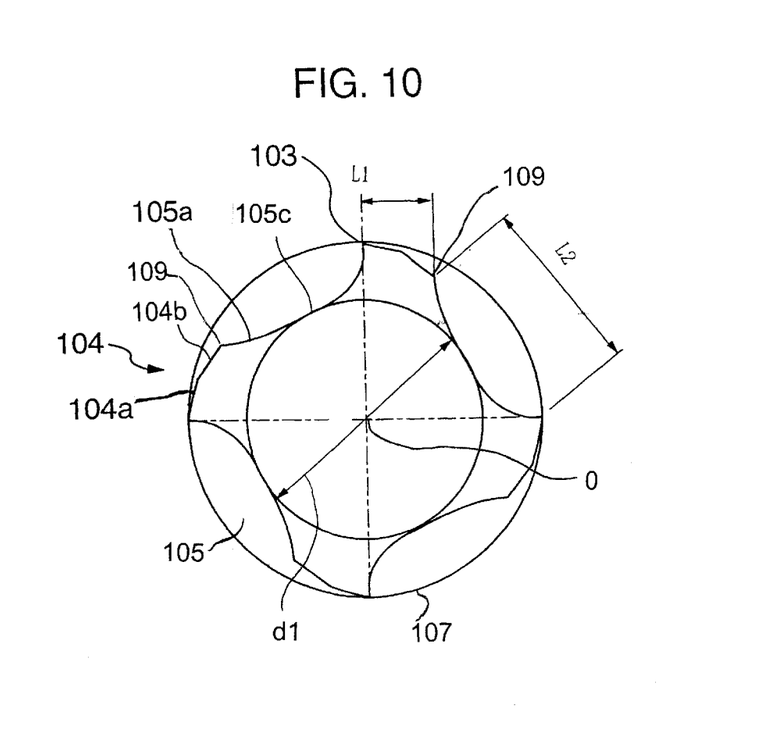
FIG. 10 shows, in an enlarged scale, a cross section taken along the line X—X of FIG. 9 which is perpendicular to the end mill axis.

Referring to FIGS. 9 and 10, the second embodiment of the invention is a 4-flute cemented carbide end mill 101 of a 10 mm diameter d. FIG. 9 shows a side view of the end mill, and FIG. 10 shows a cross section perpendicular to the end mill axis, taken along the line X—X of FIG. 9. The four peripheral cutting edges 103 of the end mill of this embodiment also have a base material of ultra-fine particle cemented carbide similar to that of the first embodiment and are also applied with the same coating on their surfaces.

The 4-flute end mill of the second embodiment has a land of 2.5 mm, which is the width from the cutting edge 103 to a heel 109, and a flute width L2 of a flute 105 of 5.35 mm, which is the distance between the heel 109 and the neighboring cutting edge 103, and a land width-to-"d"-flute width ratio is 1:2.14. The core diameter d1 is 6.5 mm, which corresponds to 65% of the outer diameter 107 of the end mill. The flank 104 comprises a first portion 104a following the cutting edge, and a second portion 104b connecting the first portion to the heel 109. The second flank portion 104b, as viewed in the cross section of FIG. 10, is in a shape slightly concave radially inwardly. The flutes 105 each have a helix angle of 40° and a slant portion 105a, as viewed in the cross section of FIG. 10, are in a curved shape smoothly concave radially inwardly. Thus, each cutting edge 103 is followed by the first and second concave shapes defined by the second flank portion 104b and the slant portion 105a.

Figure 11:
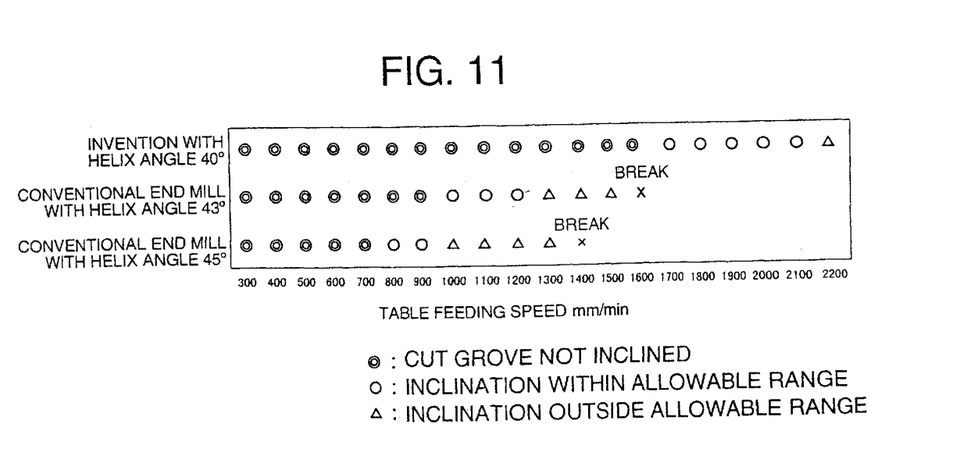
FIG. 11 shows a comparison in the limit during groove cutting between the end mill of the second embodiment and the 4-flute cemented carbide end mill of the conventional shape.

A cutting test was conducted to compare the 4-flute end mill of the second embodiment and the 4-flute end mill of a 10 mm diameter in the conventional shape shown in FIG. 3c. The conventional 4-flute end mill was of two types, one having a flute helix angle of 43° and one having 45° The ratio of the land width to the flute width is 1:6, and the core diameter is 65% of the outer diameter. The surfaces 108 of the cutting edges are coated with a hard film of titanium-aluminum nitride (TiAlN). These three end mills were used to perform a limit feeding speed test in groove cutting, and FIG. 11 shows the test result. The test condition was as follows: a cutting speed V=80 in/mm (revolution 2,550 $min^{-1}$), an axial depth of cut aa 10 mm, a lateral depth of cut ar 10 mm (groove cutting), and a material milled of SKD11 (220HB). The cutting was done in a dry condition while blowing air and changing the table feeding speed mm/min.

As seen in the result of FIG. 11, the conventional end mills with the flute helix angles of 45° and 43° were able to perform cutting without any inclination in cut grooves at the table feeding speed of 300–700 mm/min and 300–900 mm/min, respectively. These end mills caused groove inclinations within an allowable tolerance range at the table feeding speed of 800 and 900 mm/min and 1000–1200 mm/min. At the table feeding speed of 1000–1300 mm/min and 1300–1500 mm/min, they caused inclinations greater than the allowable tolerance range. At 1400 mm/min and 1600 mm/min they failed. In contrast, the end mill of the invention having a flute helix angle of 40° was able to perform cutting, by which no inclination was in a groove, up to the table feeding speed of 1600 mm/min. They caused an inclination within the allowable tolerance range at 1700–2100 mm/min and, at 2200 mm/min, produced an inclination outside the allowable tolerance range, but did not break. As can be seen from this result, the end mill of the invention is capable of high-speed feeding that is 175%–233% of that of the conventional end mills.

Figure 12:
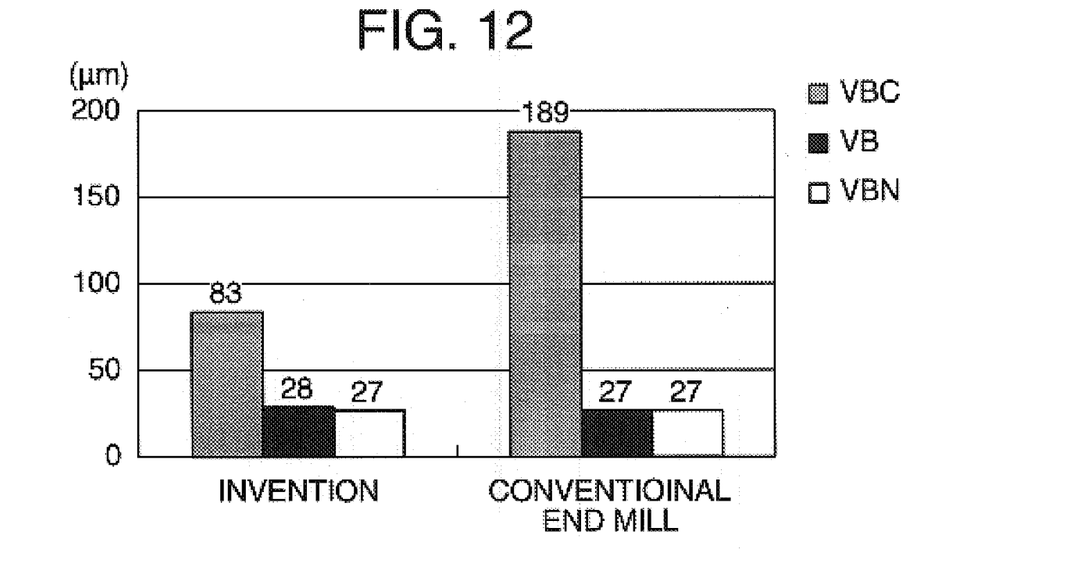
FIG. 12 shows a comparison in the amount of wear during groove cutting between the end mill of the second embodiment and the 4-flute cemented carbide end mill of the conventional shape.

Further, a groove cutting endurance test was conducted to compare the amounts of wear produced in groove cutting by the above 4-flute end mill of the second embodiment and by the conventional 4-flute end mill with the flute helix angle of 43°. This test was done with the material changed to SKD61 (40HRC). The test condition was as follows: a cutting speed V=50 m/min (revolution 1,600 $min^{-1}$), a table feeding speed 256 mm/min (0.04 mm/cutting edge), an axial depth of cut aa 5 mm, and a lateral depth of cut ar 10 mm (groove cutting). The cutting was done in a dry condition while blowing air, and after the cutting was performed for a length of 7.5 m, measurements were made of the amounts of corner wear VBC, flank wear VB and boundary wear VBN of the end mill. The result of the measurements is shown in FIG. 12. As seen in the result of FIG. 12, the corner wear in the end mill of the invention is reduced by 55% as compared with that of the conventional end mill.

Figure 13:
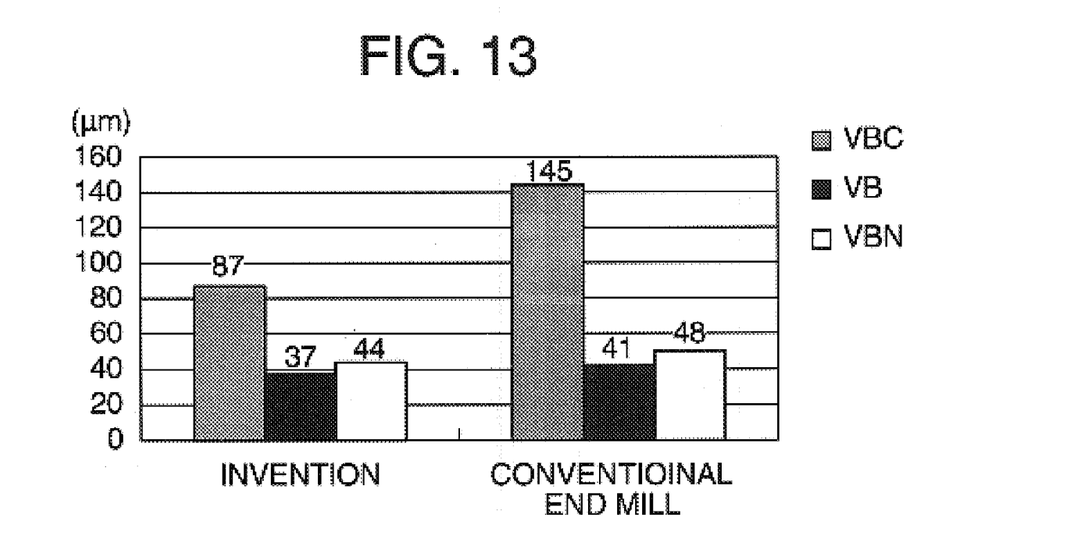
FIG. 13 shows a comparison in the amount of wear during side-surface cutting between the end mill of the second embodiment and the 4-flute cemented carbide end mill of the conventional shape.

Further, a side-surface cutting endurance test was conducted, with the material changed to SDK11 (220HB). The amounts of wear resulting from the side-surface cutting were compared between the 4-flute end mill of the second embodiment of the invention and the above conventional 4-flute end mill with the flute helix angle of 43°. The test condition was as follows: a cutting speed V=55 mm/min (revolution 1,750 $min^{-1}$), a table feeding speed 600 mm/min, an axial depth of cut aa 15 mm, and a lateral depth of cut ar 1 mm. The cutting was done in a dry condition while blowing air and in a down cutting mode. After the cutting was done for a length of 15 mm, measurements were made of the amounts of corner wear VBC, flank wear VB and boundary wear VBN of the end mill. FIG. 13 shows the test result. As seen in FIG. 13, the corner wear in the end mill of the invention is reduced by 40% as compared with that of the end mill of the conventional shape.

Next, a modification of the 4-flute end mill according to the invention will be described. The end mill of the modification is made from the same material as that for the second embodiment and in the shape shown in FIGS. 9 and 10, except for the shape of flutes and parts dimensions. For simplification, showing of this modification in the drawings is omitted, and only the modified points will be described.

The end mill of the modification has an outer diameter of 10 mm and, when viewed in a cross section perpendicular to the axis, a land width L1 of 3.1 mm, a flute width L2 of 4.7 mm, and a land width-to-flute width ratio is 1:1.5. The core diameter is 6.2 mm, which is 62% of the outer diameter. The flank of the cutting edge is comprised of an almost straight single portion, and therefore a concave portion following the cutting edge is only the flute which is in a curved shape smoothly concave radially inwardly, similarly to the second embodiment. The flutes have a helix angle of 45°. Also for the end mill of this modification, a cutting test, a groove cutting endurance test, and a side-surface machining endurance test, which were similar to those of the second embodiment were conducted, and a similar result to that of the end mill of the second embodiment was attained.

Although the present invention has been descried on the basis of the embodiments, the invention is not limited solely to these specific forms. It should be appreciated that various modifications may be made to the specific forms described above or the invention may take any other forms without departing from the scope of this invention defined by the attached claims.

What is claimed is:

1. A cemented carbide end mill comprising:

three or more cutting edges formed on a periphery thereof, each of cutting edges having a base material of ultra-fine particle cemented carbide alloy containing 10%–14% cobalt and being coated with a titanium-aluminum nitride hard film;

a plurality of flutes each provided between adjacent cutting edges, each of flutes having a helix angle of 35°–60° and, as viewed in a cross section perpendicular to an axis of the end mill, being in a shape generally concave radially inwardly, wherein each of said cutting edges has a first flank following the cutting edge and a second flank connecting the first flank and a heel, and said second flank is in a shape generally concave radially inwardly, and said cutting edges and said flutes being formed such that a land width which is the width from the cutting edge to the heel, and a flute width, which is the distance between the neighboring cutting edge and the heel, as viewed in the cross section perpendicular to the axis of the end mill, are in a ratio of 1:1.5 to 1:4, and the end mill has a core diameter that is 62%–68% of an outer diameter thereof.

2. A cemented carbide end mill according to claim 1, wherein the end mill has three cutting edges, each of said flutes comprise between the heel and a flute bottom, first and second slant portions, which, as viewed in a cross section perpendicular to an axis of the end mill, are generally concave radially inwardly and are connected to each other with their intersecting point protruding radially outwardly, said ratio of the land width to the flute width is 1:2 to 1:4, and said helix angle is 40°–50°.

3. A cemented carbide end mill according to claim 1, wherein the end mill has four cutting edges, each said second flank portion of said four cutting edges, as viewed in the cross section perpendicular to an axis of the end mill, are in a shape generally concave radially inwardly, and said flutes each have a slant portion in a curved shape generally concave radially inwardly, in which these two portions are intersected such that the intersecting point protrudes radially outwardly, said ratio of the land width to the flute width being 1:1.5 to 1:3, and said helix angle being 35°–45°.

* * * * *